(12) United States Patent
Bakhsh et al.

(10) Patent No.: US 7,055,852 B2
(45) Date of Patent: Jun. 6, 2006

(54) INFLATABLE WINDSHIELD CURTAIN

(75) Inventors: Ali Emam Bakhsh, Rochester Hills, MI (US); Al A. Saberan, New Baltimore, MI (US); Ayad G. Nayef, Sterling Heights, MI (US); Jay Blackson, Dryden, MI (US); Chang H. Lee, West Bloomfield, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 10/659,601

(22) Filed: Sep. 9, 2003

(65) Prior Publication Data

US 2005/0052004 A1 Mar. 10, 2005

(51) Int. Cl.
*B60R 21/22* (2006.01)

(52) U.S. Cl. .................. 280/730.1; 280/743.1
(58) Field of Classification Search ............. 280/730.1, 280/730.2, 743.1
See application file for complete search history.

(56) References Cited

U.S. PATENT DOCUMENTS

| 4,169,613 | A | * | 10/1979 | Barnett ..................... 280/732 |
| 5,205,583 | A | * | 4/1993 | Henseler et al. ......... 280/743.1 |
| 5,562,302 | A | | 10/1996 | Turnbull |
| 5,602,734 | A | | 2/1997 | Kithil |
| 5,732,973 | A | * | 3/1998 | Turnbull et al. .......... 280/743.1 |
| 5,836,612 | A | * | 11/1998 | Lang ........................ 280/743.1 |
| 6,129,382 | A | * | 10/2000 | Tonooka ................... 280/743.1 |
| 6,179,326 | B1 | | 1/2001 | Breed et al. |
| 6,224,088 | B1 | | 5/2001 | Lohavanijaya |
| 6,460,878 | B1 | * | 10/2002 | Eckert et al. ............ 280/730.1 |
| 6,588,793 | B1 | * | 7/2003 | Rose ........................ 280/728.2 |
| 6,702,322 | B1 | * | 3/2004 | Eyrainer et al. ......... 280/730.1 |
| 6,722,691 | B1 | * | 4/2004 | Håland et al. ........... 280/730.1 |

FOREIGN PATENT DOCUMENTS

JP 06239191 A * 8/1994

\* cited by examiner

*Primary Examiner*—Faye M. Fleming
(74) *Attorney, Agent, or Firm*—Tarolli, Sundheim, Covell & Tummino L.L.P.

(57) ABSTRACT

A windshield curtain (14) is inflatable away from a roof (40) of a vehicle (12) to a position between a windshield (50) of the vehicle and a vehicle occupant and between an instrument panel (64) of the vehicle and the vehicle occupant. The windshield curtain (14) includes a center panel (102) that has a length and opposite first and second side portions (110 and 112) that extend along its length. The windshield curtain (14) also includes first and second side panels (230 and 240), each having a respective periphery (232 and 242). The periphery (232) of the first side panel (230) is interconnected with the center panel (102) along the first side portion (110) of the center panel. The periphery (242) of the second side panel (112) is interconnected with the center panel along the second side portion (112) of the center panel.

25 Claims, 4 Drawing Sheets

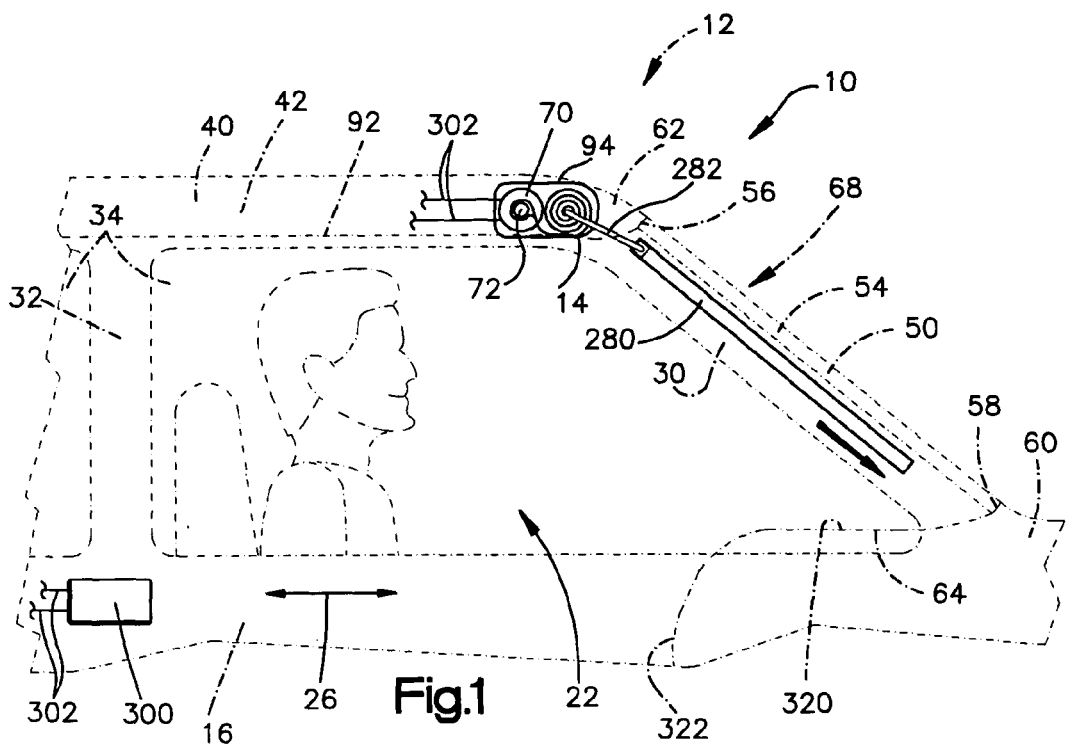
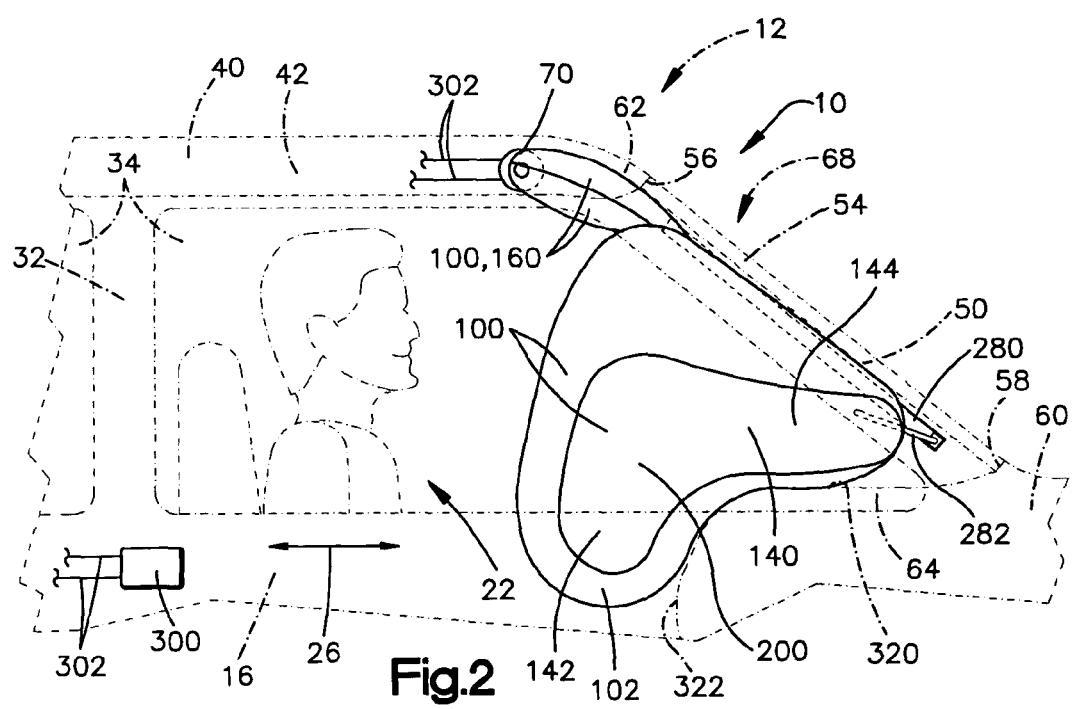

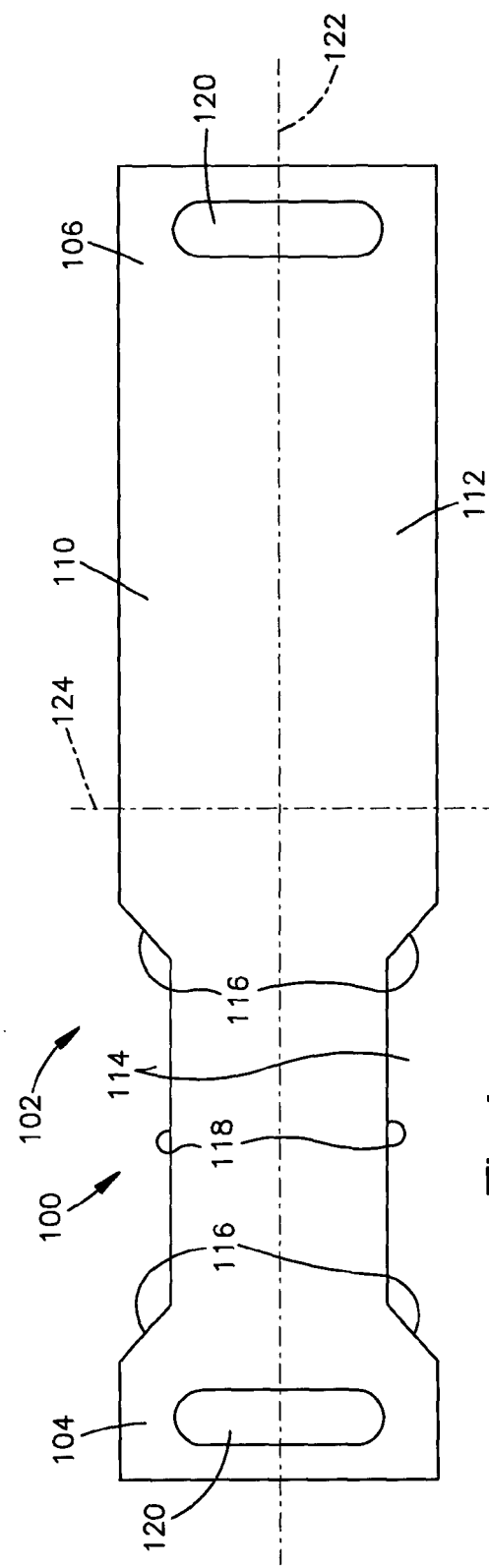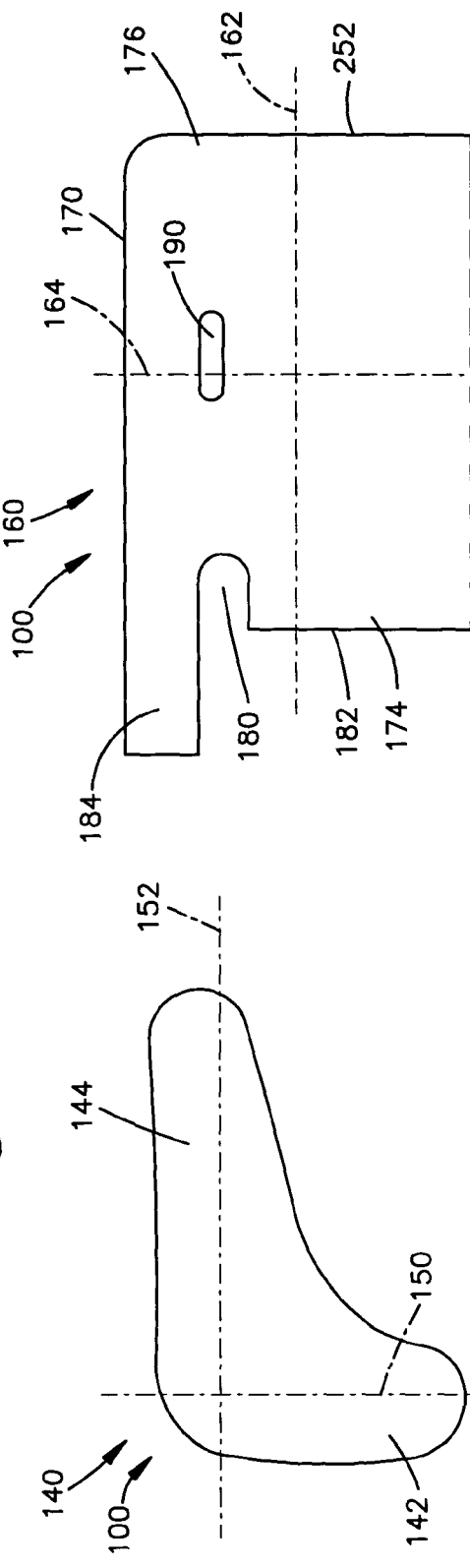

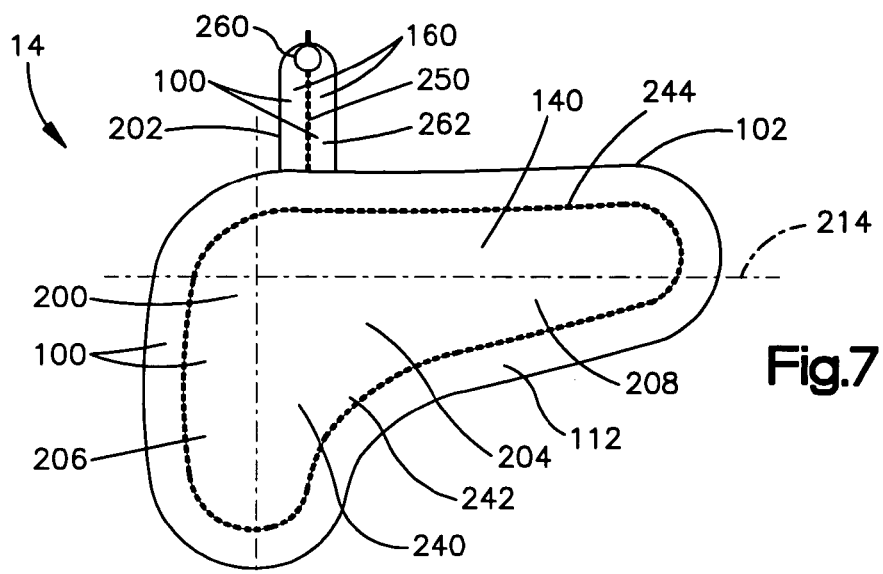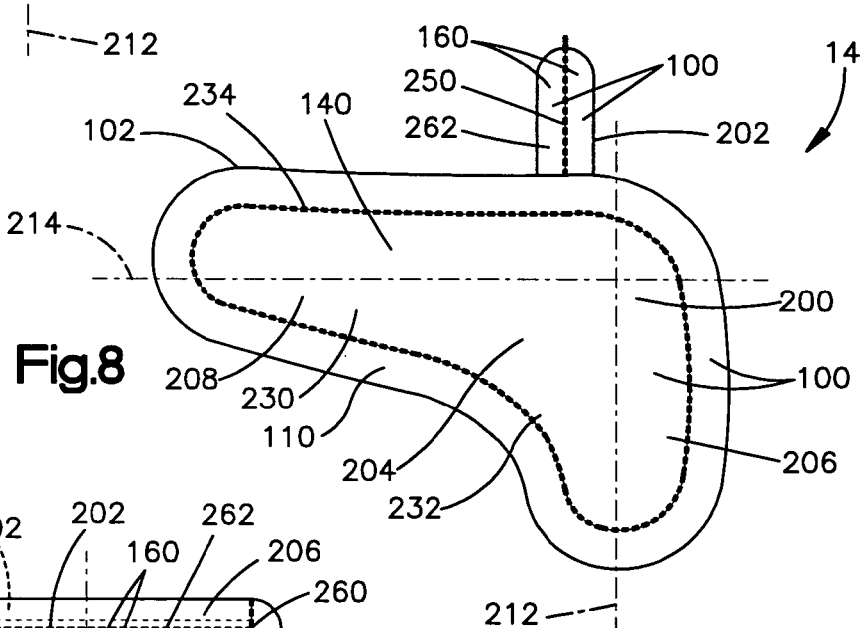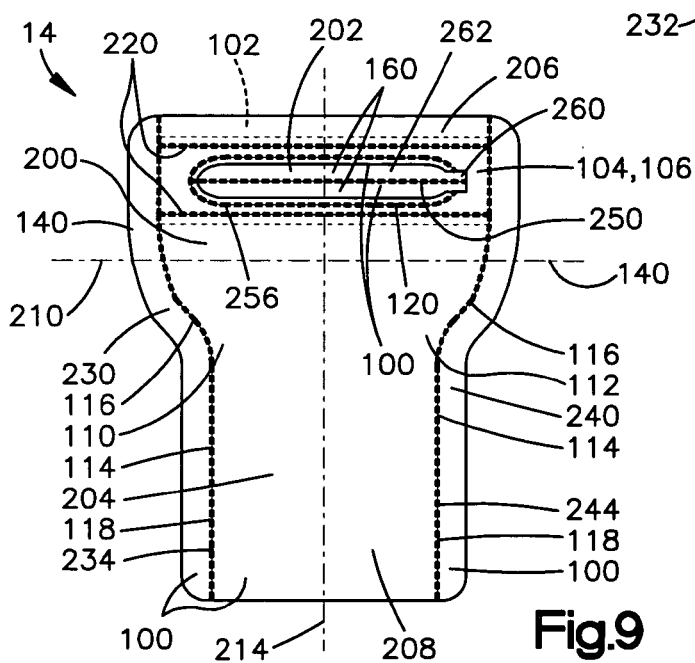

INFLATABLE WINDSHIELD CURTAIN

FIELD OF THE INVENTION

The present invention relates to an apparatus including an inflatable vehicle occupant protection device for helping to protect a vehicle occupant upon the occurrence of an event such as a vehicle collision and/or a vehicle rollover.

BACKGROUND OF THE INVENTION

It is known to inflate an inflatable vehicle occupant protection device to help protect a vehicle occupant upon the occurrence of an event such as a vehicle collision or rollover. One particular type of inflatable vehicle occupant protection device is an inflatable driver or passenger air bag that is inflatable between the occupant and an instrument panel and/or steering wheel of the vehicle. Another type of inflatable vehicle occupant protection device is an inflatable side curtain that inflates away from the vehicle roof to a position between the vehicle occupant and a side structure of the vehicle. Other known types of inflatable vehicle occupant protection devices include seat-mounted side impact air bags, inflatable knee bolsters, and inflatable seat belts. The known inflatable vehicle occupant protection devices are inflated from a deflated condition by inflation fluid provided by an inflator.

Another type of inflatable vehicle occupant protection device is an inflatable windshield curtain. Windshield curtains are inflatable away from the vehicle roof to a position between the vehicle occupant and a windshield and instrument panel of the vehicle. Windshield curtains are typically constructed of overlying panels of material that are interconnected with each other to define an inflatable volume of the curtain. Connections interconnect the overlying panels along a periphery of the curtain and may also interconnect the panels within the periphery to define inflatable chambers of the curtain. The shape and dimensions of the windshield curtain are thus defined by the shape and spacing of the connections that interconnect the overlying panels of the curtain.

SUMMARY OF THE INVENTION

The present invention relates to a windshield curtain that is inflatable away from a roof of a vehicle to a position between a windshield of the vehicle and a vehicle occupant and between an instrument panel of the vehicle and the vehicle occupant. The windshield curtain includes a center panel that has a length and opposite first and second side portions that extend along its length. The center panel has opposite first and second side portions that extend its length. The windshield curtain also includes first and second side panels, each having a respective periphery. The periphery of the first side panel is interconnected with the center panel along the first side portion of the center panel. The periphery of the second side panel is interconnected with the center panel along the second side portion of the center panel.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic side view of an apparatus for helping to protect a vehicle occupant illustrating the apparatus in a deflated and stored condition, according to a first embodiment of the present invention;

FIG. 2 is a schematic side view of the apparatus of FIG. 1 in an inflated and deployed condition;

FIGS. 4–6 are schematic views illustrating individual panels used to construct a windshield curtain of the apparatus; and FIGS. 7–9 are schematic views of the windshield curtain showing the curtain from different angles.

DESCRIPTION OF EMBODIMENTS

Figure 3:
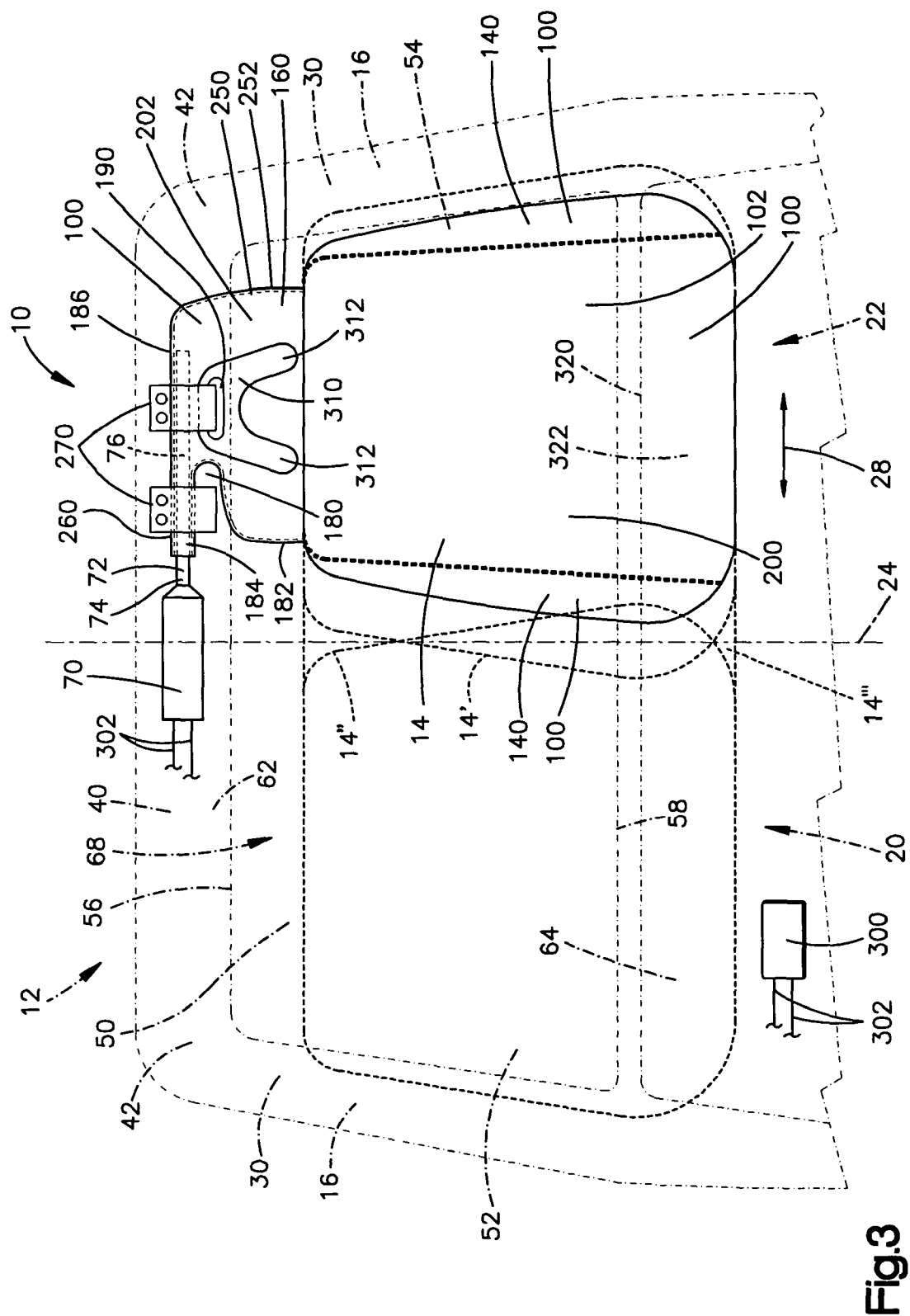
FIG. 3 is a schematic front view of a portion of the apparatus of FIG. 2.

In this description of embodiments of the present invention, when reference is made to a longitudinal direction in or along the vehicle 12, it is meant to describe the direction measured generally along a longitudinal axis of the vehicle. This longitudinal direction is indicated generally by the arrows labeled 26 in FIGS. 1 and 2. The longitudinal direction may also be described as the direction measured generally along the length of the vehicle 12, in the direction of straight forward vehicle travel, or horizontally as viewed in FIGS. 1 and 2.

Also, in this description of the present invention, when reference is made to a lateral direction in or across the vehicle 12, it is meant to describe a direction measured generally perpendicular to the longitudinal direction. This lateral direction is indicated generally by the arrows labeled 28 in FIG. 3. The lateral direction may also be described as the direction measured generally along the width of the vehicle 12, perpendicular to the direction of straight forward vehicle travel, or horizontally as viewed in FIG. 3.

Referring to FIGS. 1 and 2, as representative of the present invention, an apparatus 10 helps to protect an occupant of a vehicle 12. The vehicle 12 includes side structure 16 that extends longitudinally along the length of the vehicle. Referring to FIG. 3, it will be appreciated that the vehicle 12 includes a side structure 16 that extends along a driver side 20 of the vehicle and a side structure that extends along a passenger side 22 of the vehicle 12. The side structures 16 on the driver side 20 and passenger side 22 each include an A pillar 30, a B pillar 32 (see FIGS. 1 and 2), and side windows 34.

Referring to FIGS. 1–3, the vehicle 12 also includes a roof 40 that extends laterally across the vehicle 12 from the side structure 16 on the driver side 20 to the side structure on the passenger side 22 of the vehicle. The roof 40 also extends longitudinally along the length of the vehicle 12 from the A pillar 30 past the B pillar 32. The roof 40 includes roof rails 42 that extend along the intersection of the side structure 16 and the roof on the driver side 20 and passenger side 22 of the vehicle 12.

The vehicle 12 also includes a windshield 50. The windshield 50 extends laterally across the vehicle 12 from the A pillar 30 on the driver side 20 to the A pillar on the passenger side 22. The windshield 50 covers a windshield opening 68 of the vehicle 12. The windshield opening 68 is defined at an upper extent by a forward edge portion 62 of the vehicle roof 40 (e.g., a header of the roof) and at a lower extent generally by an instrument panel 64 and/or a hood 60 of the vehicle 12. The windshield opening 68 is defined at lateral extents by the A pillars 30 on the driver side 20 and passenger side 22 of the vehicle 12.

The windshield 50 has a first edge portion 52 that extends along the A pillar 30 on the driver side 20 from a position adjacent or near the intersection of the A pillar and the vehicle roof 40 to a position adjacent or near the intersection of the A pillar and the instrument panel 64 and/or hood 60 of the vehicle 12. The windshield 50 also has a second edge portion 54 opposite the first edge portion 52. The second edge portion 54 extends along the A pillar 30 on the passenger side 22 from a position adjacent or near the intersection of the A pillar and the vehicle roof 40 to a position adjacent or near the intersection of the A pillar and the instrument panel 64 and/or hood 60 of the vehicle 12.

The windshield 50 extends from the roof 40 to a position adjacent or near the instrument panel 64 and/or hood 60 of the vehicle 12. The windshield 50 has an upper edge 56 and an opposite lower edge 58 that extend laterally in the vehicle 12 between the first and second edge portions 52 and 54. The upper edge 56 extends laterally across the vehicle 12 along the forward edge 62 of the vehicle roof 40 from the A pillar on the driver side 20 to the A pillar on the passenger side 22. The lower edge 58 extends laterally across the vehicle 12 from the A pillar on the driver side 20 to the A pillar on the passenger side 22. The lower edge 58 extends adjacent or near the instrument panel 64 and/or hood 60 of the vehicle 12.

The apparatus 10 includes an inflatable vehicle occupant protection device in the form of an inflatable windshield curtain 14 that is mounted in the vehicle 12 adjacent the forward edge 62 of the vehicle roof 40. An inflator 70 is connected in fluid communication with the windshield curtain 14 through a fill tube 72. The inflator 70 is actuatable to provide inflation fluid for inflating the windshield curtain 14.

The fill tube 72 has a first portion 74 (FIG. 3) for receiving fluid from the inflator 70. The fill tube 72 has a second portion 76 disposed in the windshield curtain 14. The second portion 76 of the fill tube 72 has a plurality of openings (not shown) that provide fluid communication between the fill tube 72 and the windshield curtain 14. Those skilled in the art will appreciate that the fill tube 72 could be omitted, in which case the inflator 70 may be connected in fluid communication with the windshield curtain 14 directly or via a manifold (not shown).

The inflator 70 contains a stored quantity of pressurized inflation fluid (not shown) in the form of a gas for inflating the windshield curtain 14. The inflator 70 alternatively could contain a combination of pressurized inflation fluid and ignitable material for heating the inflation fluid, or could be a pyrotechnic inflator that uses the combustion of gas-generating material to generate inflation fluid. As a further alternative, the inflator 70 could be of any suitable type or construction for supplying a medium for inflating the windshield curtain 14.

As shown in FIG. 3, the inflator 70 is positioned on the vehicle roof 40 adjacent or near the forward edge 62 of the roof. The fill tube 72 thus extends from the inflator 70 along the forward edge 62 of the roof and into the windshield curtain 14. It will be appreciated, however, that the inflator 70 may have alternative positions in the vehicle 12.

For example, the inflator 70 may be positioned adjacent the roof rail 42 on the driver side 20 or passenger side 22 of the vehicle 12. As another example, the inflator 70 could be positioned in or on the A pillar 30 on the driver side 20 or passenger side 22 of the vehicle 12. As a further example, the inflator 70 could be positioned centrally on the roof 40, in which case the inflator may have a T-shaped or L-shaped connection with the fill tube 72. This central location may also be advantageous in a configuration of the apparatus in which the fill tube 72 is omitted and the inflator 70 is connected to the windshield curtain 14 directly or via a manifold. Yet another example is to position the inflator 70 within the instrument panel 64 of the vehicle 12.

Referring to FIG. 1, the apparatus 10 has a stored condition in which the windshield curtain 14 is stored in a deflated condition. When the apparatus 10 is in the stored condition, the deflated windshield curtain 14 has an elongated configuration and extends along the forward edge 62 of the vehicle roof 40 adjacent or near the upper edge 56 of the windshield 50.

The windshield curtain 14 is placed in the deflated and stored condition by rolling the curtain in a manner referred to herein as an "outboard roll" of the windshield curtain. The outboard roll of the windshield curtain 14 is shown in FIG. 1. To produce this outboard roll, the windshield curtain 14 is rolled up in a direction outboard of the vehicle 12 toward the windshield 50. Alternative methods may be used to place the windshield curtain 14 in the stored position. For example, the windshield curtain 14 may be folded in a back-and-forth manner sometimes referred to as a "fan fold" or "Z fold." As another example, the windshield curtain 14 may be folded over and then rolled into the stored position.

When the windshield curtain 14 is in the deflated and stored condition, the curtain is positioned between the vehicle roof 40 and a headliner 92 of the vehicle 12. The apparatus 10 may also include a housing 94 that houses the windshield curtain 14 in the stored condition between the roof 40 and the headliner 92.

The windshield curtain 14 is formed from separate panels of material that are interconnected to define a desired configuration, i.e., shape and dimensions of the curtain. The panels of the windshield curtain 14 may have a variety of material constructions. For example, the panels may be constructed of a woven fabric, such as nylon, that is coated with a gas impermeable material, such as urethane or silicone. The windshield curtain 14 thus may have a substantially gas-tight construction. Other materials, such as elastomers, plastic films, or combinations thereof, may also be used to construct the windshield curtain 14, in which case the curtain may have a non-woven construction. The materials used to construct the windshield curtain 14 may also be single or multi-layered materials.

The panels used to construct the windshield curtain 14 of the illustrated embodiment of the present invention are illustrated at 100 in FIGS. 4–6. Referring to FIG. 4, a center panel 102 has an elongated generally rectangular shape. The center panel 102 has a length measured along an axis 122 of the panel and a width measured transverse to its length along or parallel to an axis 124. The center panel 102 includes first end portion 104 and an opposite second end portion 106 spaced along the length of the panel. The center panel 102 also includes opposite first and second side portions 110 and 112, respectively, that extend along the length of the panel from the first end portion 104 to the second end portion 106.

As shown in FIG. 4, the center panel 102 may include cutout portions 114 that extend into the first and second side portions 110 and 112, thus reducing the width of the center panel along a portion of its length. Each cutout portion 114 has opposite end portions 116 that extend into their respective side portion 110 and 112 at an angle. Each cutout portion 114 also has a central portion 118 that extends between the end portions in a direction generally parallel to the length, i.e., the axis 122, of the center panel 102. Each of the first and second end portions 104 and 106 includes an aperture 120 that extends through the center panel 102. The apertures 120 have a generally elongated configuration with rounded end portions.

Referring to FIG. 5, a side panel 140 has a generally rounded and L-shaped configuration. A first portion 142 of the side panel 140 has a length that extends transverse to a length of a second portion 144 of the panel. As shown in FIG. 5, the length of the first portion 142 is measured in the direction of the axis labeled 150. The first portion 142 also has a width measured in the direction of the axis labeled 152. The length of the second portion 144 is measured in the direction of the axis labeled 152. The second portion 144 also has a width measured in the direction of the axis labeled 150. In the illustrated embodiment, the first portion 142 is shorter in length and greater in width than the second portion 144. The dimensions of the side panel 140 could, however, vary in order to help provide a desired configuration of the windshield curtain 14.

Referring to FIG. 6, a retainer panel 160 has a generally rectangular configuration. The retainer panel 160 has a length measured along an axis 162 and a width measured transverse to its length along an axis 164. The retainer panel 160 includes spaced upper and lower edges 170 and 172, respectively, that extend along the length of the panel. The retainer panel 160 also includes first and second end portions 174 and 176, respectively, that are spaced apart along the length of the panel and extend between the upper and lower edges 170 and 172.

The first end portion 174 of the retainer panel 160 includes a cutout portion 180 that extends into the first end portion from a first edge 182 of the retainer panel. The first end portion 174 also includes a portion 184 that extends outward from the first end portion. The portion 184 is located adjacent the intersection of the first edge 182 and the upper edge 170 of the retainer panel 160. The retainer panel further includes an aperture 190 that extends through the panel.

The assembled windshield curtain 14 is illustrated in FIGS. 7–9. In FIGS. 7–9, the windshield curtain 14 is shown in a partially inflated condition in order to illustrate how the panels 100 are positioned relative to each other and interconnected with each other in order to construct the curtain. FIGS. 7–9 thus show the general form of the windshield curtain 14. It will be appreciated that, when the windshield curtain 14 is inflated, the panels 100 may tend to expand or bulge out from the general form illustrated in FIGS. 7–9. For example, when the windshield curtain 14 is in the inflated condition, the center panel 102 may expand or bulge somewhat from the condition illustrated in FIG. 7 to the condition illustrated in FIG. 2. The windshield curtain 14 when inflated will, however, maintain the general shape and form dictated by the configuration of the interconnected panels 100.

In its assembled condition, the windshield curtain 14 includes a center panel 102, a pair of side panels 140, and a pair of retainer panels 160. The windshield curtain includes a main body portion 200 and a retainer portion 202. The main body portion 200 of the windshield curtain 14 defines an inflatable volume 204 that, when inflated, becomes positioned between an occupant of the vehicle 12 and the windshield 50 and/or instrument panel 64 of the vehicle (see FIG. 2). The retainer portion 202 helps connect the windshield curtain 14 to the vehicle 12 and provides fluid communication between the inflator 70 and the inflatable volume 204. The retainer portion 202 may also inflate to a position between a vehicle occupant and the windshield 50.

The center panel 102 helps define a central portion of the main body portion 200 of the windshield curtain 14. The main body portion 200 has a front portion 206 that helps form an inflatable front chamber of the windshield curtain 14, and a rear portion 208 that helps form an inflatable rear chamber of the windshield curtain. The side panels 140 help define opposite side portions of the windshield curtain 14. The windshield curtain 14, when inflated, has a width measured generally along the axis labeled 210 in FIG. 9, a height measured generally along the axis labeled 212 in FIGS. 7 and 8, and a depth measured generally along the axis labeled 214 in FIGS. 7–9.

Referring to FIG. 9, in the assembled condition of the windshield curtain 14, the center panel 102 is looped such that the first and second end portions 104 and 106 are positioned in an adjacent and overlying manner. Also, the end portions 104 and 106 are positioned such that the apertures 120 are aligned with each other. The first and second end portions 104 and 106 are interconnected by means 220, such as stitching, in order to maintain the center panel 102 in the looped condition. The center panel 102 is thus formed as an endless loop of material. It will be appreciated that this endless loop configuration of the center panel 102 may be formed by alternative methods, such as weaving the panel as an endless loop.

In the assembled condition, the windshield curtain 14 includes two side panels 140. A first side panel 230 (FIGS. 8 and 9) has a periphery 232 that overlies the first side portion 110 of the center panel 102. A connection 234, such as stitching, interconnects the overlying portions of the first side panel 230 and center panel 102. The connection 234 extends along the entire periphery 232 of the first side panel 230 and along the entire length of the first side portion 110 of the center panel 102. By "length" of the first side portion 110, it is meant to describe the distance measured from a point on the first side portion around the endless loop of material and back to the same point.

A second side panel 240 has a periphery 242 that overlies the second side portion 112 of the center panel 102. A connection 244, such as stitching, interconnects the overlying portions of the second side panel 240 and center panel 102. The connection 244 extends along the entire periphery 242 of the second side panel 240 and along the entire length of the second side portion 112 of the center panel 102. By "length" of the second side portion 112, it is meant to describe the distance measured from a point on the second side portion around the endless loop of material and back to the same point.

As illustrated in FIGS. 7 and 8, the periphery 232 of the first side panel 230 has a length that is about equal to the length of the first side portion 110 of the center panel 102 minus the overlapped length of the end portions 104 and 106. The periphery 242 of the second side panel 240 has a length that is about equal to the length of the second side portion 112 of the center panel 102 minus the overlapped length of the end portions 104 and 106. This helps provide a uniform seam between the first side panel 230 and the first and portion 110, and between the second side panel 240 and the second side portion 112.

As shown in FIG. 9, the main body portion 200 of the windshield curtain 14 may have a tapered configuration in which the rear portion 208 tapers from a first width adjacent the front portion 206 and a second smaller width spaced from the front portion. In this configuration, the front portion 206 may have a width that is greater than the width of the rear portion 208. The cutout portions 114 of the center panel help form this tapered configuration of the windshield curtain 14. The angled end portions 116 of the cutout portions 114 taper the width of the center panel 102 down to the width measured between the central portions 118 of the cutout portions.

In the assembled condition, the windshield curtain 14 includes two retainer panels 160 interconnected to form the retainer portion 202 of the curtain. The retainer panels 160 are positioned in an overlying manner such that their respective cutout portions 180, portions 184, and apertures 190 are aligned with each other (see FIG. 3). A connection 250 (FIGS. 7–9) interconnects the overlying retainer panels 160 to help form the retainer portion 202. The connection 250 extends along the side edges 182, upper edges 170, and side edges 252 of the overlying retainer panels 160. The retainer portion 202 may also include a connection 310 (FIG. 3) that surrounds the aperture 190. The overlying portions 184 of the retainer panels 160 help form a fill tube receiving portion 260 of the windshield curtain 14. The fill tube receiving portion 260 forms an inlet for allowing the introduction of inflation fluid into the retainer portion 202.

The retainer portion 202 may have a construction alternative to the separate overlying retainer panel 160 construction described above. For example, the retainer portion 202 may be constructed of a single piece of material folded over to form the overlying retainer panels 160. In this alternative, the fold may form part of the connection 250 of the retainer portion 202. As another alternative, the retainer portion 202 may have a woven construction in which the retainer panels 160 are woven simultaneously. In this construction, portions of the retainer panels 160 may be interwoven to form the connection 250 that interconnect the panels.

Referring to FIG. 9, in the assembled condition of the windshield curtain 14, the retainer portion 202 is positioned with the lower edges 172 (see FIG. 6) of the panels 160 extending through the overlying apertures 120 of the center panel 102. A connection 256 interconnects lower edges of the retainer panels 160 and, thus, the retainer portion 202, to portions of the center panel 102 surrounding the apertures 120. An internal volume 262 of the retainer portion 202 and the inflatable volume 204 of the main body portion 200 are thus connected in fluid communication with each other. The lower edges 172 of the retainer panel 202 thereby form an outlet for directing inflation fluid into the main body portion 200 of the windshield curtain 14.

The connections 220, 234, 244, 250, 256, and 310 that interconnect the panels 100 of the windshield curtain 14 may be formed in a variety of ways other than the stitching described above. For example, dielectric sealing, ultrasonic bonding, heat sealing, or adhesives may be used to interconnect the panels 100 of the windshield curtain 14.

The panels 100 of the windshield curtain 14 and the connections 220, 234, 244, 250, 256, and 310 that interconnect the panels may be laminated with a plastic film or coated using a slurry, and/or a spray coating, such as silicone, urethane, or other suitable material, in order to achieve a substantially gas-tight construction. This helps to prevent gas from permeating directly through the panels 100, or through the connections 220, 234, 244, 250, 256, and 310.

The windshield curtain 14 may be adapted to receive one or more fastening devices 270 (FIG. 3), such as clamps or brackets, for helping to connect the windshield curtain to the vehicle 12. In the illustrated embodiment, the apparatus 10 includes two fastening devices 270 for connecting the windshield curtain 14 and the fill tube 72 to the vehicle roof 40. One of the fastening devices 270 encircles the fill tube receiving portion 260 and a portion of the fill tube 72 and thus connects the windshield curtain 14 and the fill tube to the vehicle 12. The other of the fastening devices 270 extends through the fastener receiving aperture 190 of the retainer portion 202 and encircles a portion of the fill tube 72 and thus helps connect the windshield curtain 14 and the fill tube to the vehicle 12.

Referring to FIGS. 1 and 2, the apparatus 10 may also include a slider mechanism 280 for helping to guide and position the windshield curtain 14 in the vehicle 12 upon inflation and deployment of the curtain. The slider mechanism 280 is provided on the A pillar 30 on the passenger side 22 of the vehicle 12. In the embodiment of FIGS. 1–3, the windshield curtain 14 is connected to the slider mechanism 280 by a tether 282.

Those skilled in the art will appreciate that alternative means may be provided for helping to guide and position the windshield curtain 14 in the vehicle 12. For example, tethers (elastic or inelastic), piston/cylinder devices, devices actuatable to cause rotation of a member such as a spool to wind up a flexible member, or any other suitable device could help guide and position the windshield curtain 14 in the vehicle 12. Also, it will be appreciated that the slider mechanism 280 could be eliminated and the windshield curtain 14 could be connected directly to the A pillar 30 by suitable means, such as fasteners.

In the embodiment illustrated in FIG. 3, the windshield curtain 14 is a passenger side windshield curtain. The windshield curtain 14 extends across the windshield 50 on the passenger side 22 of the vehicle 12 between the passenger side A pillar 30 and the vehicle centerline 24. The windshield curtain 14 could, however, have alternative extents or coverage. For example, the windshield curtain 14 may overlie the A pillar 30 on the passenger side 22 and extend to or beyond the centerline 24, as indicated at 14' in FIG. 3. Alternatively, the windshield curtain may be positioned in a similar manner on the driver side 20 of the vehicle 12, as indicated at 14'' in FIG. 3. As another alternative, the windshield curtain may extend from the driver side 20 to the passenger side 22 of the vehicle, as indicated at 14''' in FIG. 3.

The vehicle 12 includes a sensor mechanism 300 (shown schematically in FIG. 3) for sensing an event for which inflation of the windshield curtain 14 is desired, such as a vehicle collision and/or a vehicle rollover. Upon sensing the occurrence of the event for which inflation of the windshield curtain 14 is desired, the sensor mechanism 300 provides an electrical signal over lead wires 302 to the inflator 70. The electrical signal causes the inflator 70 to be actuated in a known manner. The inflator 70 discharges fluid under pressure into the fill tube 72. The fill tube 72 directs the fluid into the internal volume 262 of the retainer portion 202 of the windshield curtain 14. The inflation fluid flows through the retainer portion 202 and into the inflatable volume 204 of the main body portion 200. As shown in FIG. 3, the connection 310 surrounding the aperture 190 of the retainer portion 202 may include arms 312 configured to help direct inflation fluid into the inflatable volume 204 of the main body portion 200.

The windshield curtain 14 inflates under the pressure of the inflation fluid from the inflator 70. The windshield curtain 14 inflates and deploys away from the roof 40 and along the windshield 50 to the position illustrated in FIGS. 2 and 3.

Referring to FIG. 3, when the windshield curtain 14 is inflated, the main body 200 portion extends laterally across the vehicle between the A pillar 30 on the passenger side 22 and the vehicle centerline 24. The main body portion 200

(FIGS. 2 and 3) of the curtain extends from near the vehicle roof 40 and the upper edge 56 of the windshield 50 down to the instrument panel 64 and along the instrument panel 64 below an upper surface 320 of the instrument panel and against a surface 322 of the instrument panel presented toward or facing an occupant of the vehicle 12 (referred to herein as a front surface). The retainer portion 202 extends from the roof 40 to the main body portion 200.

The windshield curtain 14, when inflated, is thus positioned between a vehicle occupant and the windshield 50 and windshield opening 68, as well as between the vehicle occupant and the instrument panel 64. The windshield curtain 14 provides an inflated area of protection that extends on the passenger side 22 of the vehicle 12 from the vehicle roof 40 down to adjacent the front surface 322 and below the upper surface 320 of the instrument panel, which is presented generally toward the roof 40 of the vehicle.

The windshield curtain 14, when inflated, helps to protect a vehicle occupant upon the occurrence of an event (e.g., vehicle collision or rollover) for which inflation of the windshield curtain is desired. The windshield curtain helps protect against impacts with the windshield 50 and against impacts with the instrument panel 64. The windshield curtain 14, while inflated, may help absorb the energy of impacts with the windshield curtain and may help distribute the impact energy over a large area of the curtain.

Advantageously, the construction of the windshield curtain 14, using multiple panels 100, facilitates configuring the curtain to assume a desired shape and have desired dimensions such that the curtain may provide a desired degree of coverage in the vehicle 12. As illustrated best in FIG. 2, the generally rounded L-shaped side panels 140 are configured to follow the general contour of the instrument panel 64. In particular, the first portion 142 of the side panel 140 is configured to follow the front surface 322 and the second portion 144 is configured to follow the upper surface 320.

The center panel 102, being attached to the periphery of the side panels 140, is thus held to a general shape that follows the shape of the side panels. As the center panel 102 bulges while inflated, it engages and follows the contour of the instrument panel 64. The front portion 206 of the windshield curtain 14 follows the portion of the instrument panel 64 presented toward the vehicle occupant, i.e., the front portion 322. The rear front portion 208 of the windshield curtain 14 follows the upper portion 230 of the instrument panel 64 and helps fill the space between the windshield 50 and the instrument panel. The rear portion 208 may thus help support the front portion 206 and help the front portion absorb and distribute impact forces.

It will thus be appreciated that, according to the present invention, the configuration of the side panels 140 and center panel 102 may be adjusted such that the windshield curtain 14, when inflated, may have a desired position relative to the structure (i.e., instrument panel 64, windshield 50, roof 40) of the particular vehicle 12 in which the curtain is installed. It will also be appreciated that the structural configuration of the vehicle 12 depicted in the illustrated embodiments is a simplified schematic example of a structural configuration in which the present invention may be implemented. This illustrated vehicle configuration is not meant to limit or otherwise preclude implementation of the present invention in a vehicle in which the structural configuration may differ from the structure depicted herein.

As illustrated in FIGS. 1 and 2, the instrument panel 64 has a distinct upper surface 320 that extends generally horizontally in the vehicle 12 and a distinct front surface 322 that extends at an angle with the upper surface. Those skilled in the art, however, will appreciate that the instrument panel 64 may have a variety of alternative constructions in which the upper surface 320 and front surface 322 are not as distinct and/or do not extend in the same respective directions in the vehicle 12. The instrument panel 64 could, for example, have a curved or contoured configuration free from distinct upper and front surfaces.

From the above description of the invention, those skilled in the art will perceive improvements, changes and modifications. These and other such improvements, changes and modifications within the skill of the art are intended to be covered by the appended claims.

Having described the invention, the following is claimed:

1. An apparatus for helping to protect an occupant of a vehicle, said apparatus comprising:
   a windshield curtain inflatable away from a roof of the vehicle to a position between a windshield of the vehicle and a vehicle occupant and between an instrument panel of the vehicle and the vehicle occupant, said windshield curtain comprising:
   a center panel of material having a length and opposite first and second side portions extending along its length; and
   first and second side panels each having a periphery, shaped to follow a contour of the instrument panel, said periphery of said first side panel being interconnected with said center panel along said first side portion of said center panel, said periphery of said second side panel being interconnected with said center panel along said second side portion of said center panel, the first and second side panels shaping the windshield curtain when inflated such that the center panel engages and follows an upper surface of the instrument panel and a front surface of the instrument panel without the windshield being urged against the instrument panel by another object.

2. The apparatus recited in claim 1, wherein said periphery of each side panel has a first part shaped to follow a surface of the instrument panel presented generally toward an occupant of the vehicle, and a second part shaped to follow an upper surface of the instrument panel presented toward the vehicle roof.

3. The apparatus recited in claim 1, wherein said first side panel is connected to said first side portion by a first connection, said first connection extending along the entire length of said first side portion and along the entire periphery of said first side panel;
   said second side panel being connected to said second side portion by a second connection, said second connection extending along the entire length of said second side portion and along the entire periphery of said second side panel.

4. The apparatus recited in claim 1, wherein each of said first and second side portions has a length, said length of said first side portion being about equal to a length of the periphery of said first side panel, said length of said second side portion being about equal to a length of the periphery of said second side panel.

5. The apparatus recited in claim 1, wherein said center panel is arranged to form an endless loop of material.

6. The apparatus recited in claim 5, wherein said center panel comprises a length of material having opposite end portions spaced along its length, said opposite end portions of said center panel being arranged in an adjacent and overlying relationship with each other and interconnected to form said endless loop of material.

7. The apparatus recited in claim 6, wherein each of said end portions of said center panel has an opening extending through said center panel, said openings being aligned with each other when said end portions are interconnected to form said endless loop of material.

8. The apparatus recited in claim 7, further comprising a retainer portion having an inlet portion and an outlet portion, said outlet portion extending through said aligned openings of said center panel and being interconnected with said overlying end portions of said center panel.

9. The apparatus recited in claim 8, wherein said outlet portion of said retainer portion is interconnected with said center panel along an entire periphery of said aligned openings.

10. The apparatus recited in claim 8, wherein said inlet portion of said retainer portion is adapted to receive a fill tube for delivering inflation fluid from an inflation fluid source into an inflatable volume of said windshield curtain to inflate said windshield curtain.

11. The apparatus recited in claim 8, wherein said retainer portion comprises overlying panels interconnected with each other along a portion of their respective peripheries, said panels of said retainer portion being interconnected within said peripheries to form connections for helping to direct inflation fluid into said windshield curtain.

12. The apparatus recited in claim 1, wherein said first and second side panels each have a generally rounded L-shaped configuration it which one leg extends adjacent an upper-surface of the instrument panel presented toward the vehicle roof and the other leg extends adjacent a front surface of the instrument panel presented toward the vehicle occupant when said inflatable vehicle occupant protection device is inflated.

13. The apparatus recited in claim 1, wherein each of said first and second side panels has a first portion and a second portion extending transverse to said first portion, said first portions and portions of said center panel extending between said first portions helping to define a first chamber of said windshield curtain, said second portions and portions of said center panel extending between said second portions helping to define a second chamber of said windshield curtain, said first chamber being inflatable along a front surface of an instrument panel presented generally toward the vehicle occupant, said second chamber being inflatable along the windshield and an upper surface of the instrument panel adjacent the windshield.

14. The apparatus recited in claim 13, wherein said second chamber has a tapered configuration in which said second chamber has a first width at a location adjacent said first chamber, said second chamber being tapered down to a second width less than said first width at a location spaced from said first chamber.

15. The apparatus recited in claim 14, wherein each of said first and second side portions of said center panel has a cutout portion that reduces the width of said center panel and helps form the tapered configuration of said second chamber.

16. The apparatus recited in claim 1, wherein said windshield curtain when inflated extends between a passenger side A pillar and a longitudinal centerline of the vehicle.

17. The apparatus recited in claim 1, wherein said windshield curtain when inflated extends between a driver side A pillar and a longitudinal centerline of the vehicle.

18. The apparatus recited in claim 1, wherein said windshield curtain when inflated extends between a driver side A pillar and a longitudinal centerline of the vehicle and between a passenger side A pillar and the longitudinal centerline of the vehicle.

19. The apparatus recited in claim 1, wherein said windshield curtain when inflated overlies at least a portion of an A pillar of the vehicle.

20. The apparatus recited in claim 1, wherein each of said first and second side panels has a first portion and a second portion extending transverse to said first portion, said first portions being shaped to extend along a surface of an instrument panel presented generally toward the vehicle occupant when said windshield curtain is inflated, said second portions being shaped to extend along an upper surface of the instrument panel when said windshield curtain is-inflated, the upper surface of the instrument panel extending transverse to the surface presented toward a vehicle occupant.

21. The apparatus recited in claim 1, wherein said center panel has a width measured perpendicular to the length of said center panel, said first and second side portions of said center panel each having a cutout portion that reduces the width of said center panel and thereby helps taper a width of said windshield curtain.

22. The apparatus recited in claim 1, further comprising a fill tube for delivering inflation fluid from an inflation fluid source into said windshield curtain.

23. The apparatus recited in claim 22, wherein said fill tube extends along a forward edge of the vehicle roof.

24. The apparatus recited in claim 22, wherein said fill tube has a portion located in said windshield curtain.

25. An apparatus for helping to protect an occupant of a vehicle, said apparatus comprising:

a windshield curtain inflatable away from a roof of the vehicle to a position between a windshield of the vehicle and a vehicle occupant and between an instrument panel of the vehicle and the vehicle occupant, said windshield curtain comprising:

a center panel of material having a length and opposite first and second side portions extending along its length; and first and second side panels each having a periphery, said periphery of said first side panel being interconnected with said center panel along said first side portion of said center panel, said periphery of said second side panel being interconnected with said center panel along said second side portion of said center panel, said first an second side panels each having a generally rounded L-shaped configuration in which one leg extends adjacent an upper surface of the instrument panel presented toward the vehicle roof and the other leg extends adjacent a front surface of the instrument panel presented toward the vehicle occupant when said inflatable vehicle occupant protection device is inflated.

* * * * *